(12) United States Patent
Zappa et al.

(10) Patent No.: US 11,613,322 B2
(45) Date of Patent: Mar. 28, 2023

(54) ATTACHMENT APPARATUS AND/OR SYSTEM FOR SECURELY ATTACHING OBJECTS TO A BICYCLE FRAME

(71) Applicant: ZAPPAWHEELS LLC, Chicago, IL (US)

(72) Inventors: John Zappa, Chicago, IL (US); Marta Guerrero Merino, Chicago, IL (US); David Lopez Alonso, Denver, CO (US); Alejandro Herrera Perdomo, Chicago, IL (US); Thomas Chiang, Glencoe, IL (US); David Filicicchia, West Chicago, IL (US); David Zappa, Wexford, PA (US); Mary Lubben, Chicago, IL (US)

(*) Notice: Subject to any disclaimer, the term of this patent is extended or adjusted under 35 U.S.C. 154(b) by 0 days.

(21) Appl. No.: 17/382,100

(22) Filed: Jul. 21, 2021

(65) Prior Publication Data

US 2021/0347429 A1    Nov. 11, 2021

Related U.S. Application Data

(63) Continuation-in-part of application No. 16/698,672, filed on Nov. 27, 2019, now Pat. No. 11,084,547.

(51) Int. Cl.
| | |
|---|---|
| *B60J 7/04* | (2006.01) |
| *B62J 7/08* | (2006.01) |
| *B62J 9/26* | (2020.01) |
| *B62J 7/04* | (2006.01) |
| *B62J 9/23* | (2020.01) |
| *B62J 9/27* | (2020.01) |
| *B62H 5/00* | (2006.01) |

(52) U.S. Cl.
CPC . *B62J 7/04* (2013.01); *B62J 9/23* (2020.02); *B62J 9/27* (2020.02); *B62H 2005/008* (2013.01); *B62J 7/08* (2013.01)

(58) Field of Classification Search
CPC ......... B62J 7/04; B62J 7/08; B62J 9/26; B62J 9/00; B62H 225/008
USPC ......................... 224/935, 419, 421, 415, 430
See application file for complete search history.

(56) References Cited

U.S. PATENT DOCUMENTS

| | | | | |
|---|---|---|---|---|
| 4,353,490 A | * | 10/1982 | Jackson | B62J 7/08 224/438 |
| 4,562,944 A | * | 1/1986 | Jackson | B62J 7/08 224/438 |
| 5,251,796 A | * | 10/1993 | Shelhart | B62J 11/00 224/450 |
| 5,395,016 A | * | 3/1995 | Minoura | B62H 5/00 224/935 |
| 6,209,941 B1 | * | 4/2001 | Cross | B62J 9/23 224/572 |
| 7,615,082 B2 | * | 11/2009 | Naegerl | A61F 2/4202 623/21.18 |
| 2005/0116001 A1 | * | 6/2005 | Lee | B62H 5/001 224/430 |

(Continued)

FOREIGN PATENT DOCUMENTS

WO    WO-9620865 A1 * 7/1996 ............... B62J 9/00

*Primary Examiner* — Nathan J Newhouse
*Assistant Examiner* — Lester L Vanterpool
(74) *Attorney, Agent, or Firm* — Eugenio J. Torres-Oyola; Rafael Rodriguez-Muriel; Jean G. Vidal-Font

(57) ABSTRACT

An attachment apparatus and/or system for securely attaching objects to a bicycle frame having a transport platform that is attachable to the top of a bicycle rack.

20 Claims, 17 Drawing Sheets

(56) References Cited

U.S. PATENT DOCUMENTS

2008/0296329 A1* 12/2008 Guckes .................. B62J 7/04
                                                     224/412
2010/0170924 A1*  7/2010 Johnson ............... B62B 5/0003
                                                     224/484
2010/0224662 A1*  9/2010 Crum, Jr. ................ B62J 7/04
                                                     224/430

* cited by examiner

ATTACHMENT APPARATUS AND/OR SYSTEM FOR SECURELY ATTACHING OBJECTS TO A BICYCLE FRAME

RELATED APPLICATIONS

This application is a continuation-in-part of, and claims the benefit of priority to, U.S. patent application Ser. No. 16/698,672, filed on Nov. 27, 2019, entitled "Apparatus and/or System for Securely Attaching Objects to a Bicycle Frame", the contents of which are hereby incorporated by reference.

STATEMENT REGARDING FEDERALLY SPONSORED RESEARCH AND DEVELOPMENT

N/A

BACKGROUND OF THE DISCLOSURE

Field of the Invention

The present application relates to an attachment apparatus and/or system for securely attaching objects to a bicycle frame.

Background

Bicycle commuting is an increasingly popular form of urban transportation. A common challenge with bicycle commuting, however, is transporting personal belongings while riding. For instance, a rider may have a u-lock, keys, phone, wallet, money, spare tube, patch kit and/or other items. All these possessions need to be easily secured without encumbering the rider or compromising his/her safety.

U-shaped locks present a special challenge since it is heavy, relatively large, an unusual shape and in many instances dirty. Traditional forms of carrying U-shaped locks, such as plastic brackets, require the rider to fit the lock to the bracket each time, they want to transport the lock. The bracket also takes up valuable space on the frame of the bike usually requiring the rider to give up a water bottle mount. Made from plastic, the brackets inevitable break from all the vibration typically present in riding a bike. Additionally, available methods of carrying U-shaped locks do not hold them in place in the x, y and z dimensions, thus permitting them to move and rattle.

Some riders use a bungee cord to secure the lock to a rack mounted on the rear of the bike. This again takes time to secure the lock and most annoyingly, the lock, which is metal bounces on the metal rack, thereby creating a rattling noise during the entire ride. Other riders have resorted to looping the lock over their front handlebars, which is an inherently dangerous situation given the movement of a large metal object inches from the rider's face and body.

Accordingly, there is a need for an attachment apparatus and/or system for securely attaching objects to a bicycle frame that has the capability of holding said objects in place, thus preventing them from moving and rattling. Additionally, there is a need for such an apparatus and/or system that is also durable, easy to use, does not take up too much space, does not compromise the safety of the rider; and does not impede the rider's movements.

While certain aspects of conventional technologies have been discussed to facilitate disclosure of the invention, Applicant in no way disclaims these technical aspects, and it is contemplated that the claimed invention may encompass one or more of the conventional technical aspects discussed herein. In this specification where a document, act, or item of knowledge is referred to or discussed, this reference or discussion is not an admission that the document, act, or item of knowledge or any combination thereof was at the priority date, publicly available, known to the public, part of common general knowledge, or otherwise constitutes prior art under the applicable statutory provision; or is known to be relevant to an attempt to solve any problem with which this specification is concerned.

SUMMARY

The present disclosure relates to an attachment apparatus and/or system for securely attaching objects to a bicycle frame that comprises a transport platform that is attachable to the top of a bicycle rack, wherein the platform comprises a rectangular base with raised edges having one or more cutout portions; wherein the base includes a first end and a second end that are parallel to each other and have the same length, a first side and a second side that are parallel to each other and have the same length, and wherein the length of the first and second sides of the base is greater than the length of the first and second ends of the base; and wherein the base further includes one or more holes on the cutout portions that cross through the surface of the base. The transport platform further comprises a caddy attachment having a rim and a U-shaped bottom portion; a single piece rail configured to be mechanically inserted or fitted into grooves at the bottom of the base; wherein the rail includes: a first end and a second end that are parallel to each other and have the same length, a first side and a second side that are parallel to each other and have the same length, wherein the length of the first and second sides of the rail is greater than the length of the first and second ends of the rail; wherein the rail protrudes or extends beyond the perimeter of the first and second sides of the base, thus creating a cavity between the corresponding first and second sides of the base and the corresponding first and second sides of the rail; and wherein a first portion of the rim of the caddy attachment is secured to the cutout portions of the base and a second portion of the rim is resting on the rail.

The present disclosure may address one or more of the problems and deficiencies of the prior art discussed above. However, it is contemplated that the disclosure may prove useful in addressing other problems and deficiencies in a number of technical areas. Therefore, the claimed invention should not necessarily be construed as limited to addressing any of the particular problems or deficiencies discussed herein.

BRIEF DESCRIPTION OF THE DRAWINGS

These and other features, aspects, and advantages of the present invention will become better understood with regard to the following description, appended claims and accompanying drawings where:

DETAILED DESCRIPTION

Figure 1:
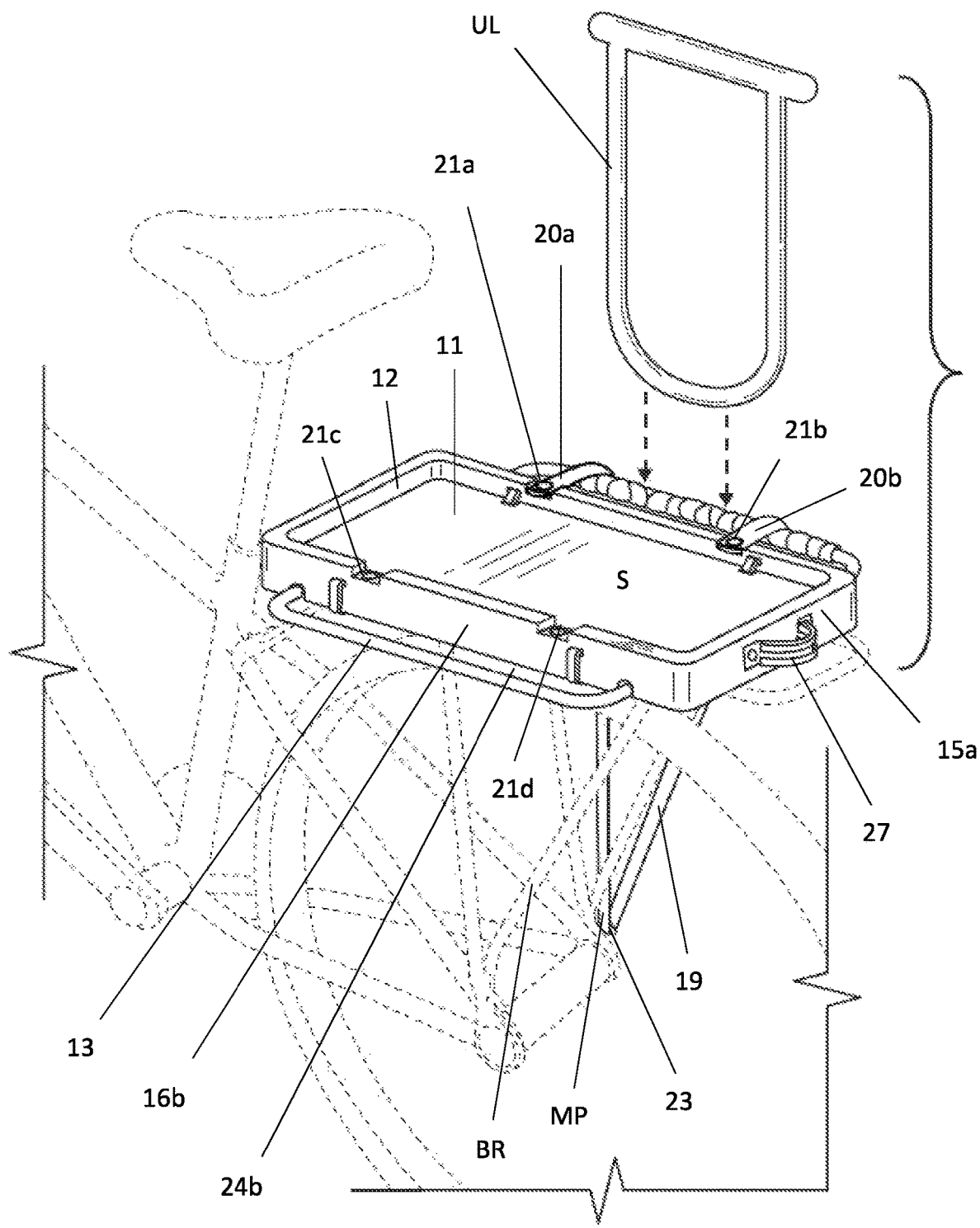
FIG. 1 shows a left-side perspective view of the attachment apparatus and/or system for securely attaching objects to a bicycle frame, in accordance with principles of the present disclosure.

In the Summary above, the Description below, and in the accompanying drawings, reference is made to particular features of the present disclosure. It is to be understood that the disclosure includes possible combinations of such particular features. For example, where a particular feature is disclosed in the context of a particular aspect or exemplary embodiment, or a particular claim, that feature can also be used, to the extent possible, in combination with and/or in the context of other particular aspects and exemplary embodiments, and in the invention generally.

The term "comprises" and grammatical equivalents thereof are used herein to mean that other components, structures, steps, etc. are optionally present. For example, an article "comprising" (or "which comprises") components A, B, and C can consist of (i.e., contain only) components A, B, and C, or can contain not only components A, B, and C, but also one or more other components or structures.

The term "at least" followed by a number is used herein to denote the start of a range beginning with that number (which may be a range having an upper limit or no upper limit, depending on the variable being defined). For example, "at least 1" means 1 and/or more than 1.

The term "mechanical features" or "mechanical coupled" is used herein to mean features of a component, mechanical or geometric, which have a functional purpose of attaching or linking that component to one or more other components with compatible or corresponding mechanical features. An example of a mechanical feature is a slot in a component, where said slot is designed to accept a tab from another component and the union of the slot and tab from the two components effectively links, attaches, fixes, and/or locks the components together. The term "mechanical features" refers to, but is not limited to: clips, hooks, hook and loop fasteners, slot and tabs, all male and female fasteners, screws, bolts, nuts, holes that have been tapped, latches, pins, etc.

While the specification will conclude defining the features of exemplary embodiments of the disclosure that are regarded as novel, it is believed that the disclosure will be better understood from a consideration of the following description in conjunction with the figures, in which like reference numerals are carried forward.

FIG. 1 shows a left-side perspective view of the attachment apparatus and/or system for securely attaching objects to a bicycle frame, in accordance with principles of the present disclosure. The attachment apparatus and/or system for securely attaching objects to a bicycle frame comprises a transport platform 10 that is configured to be attached to the top of a bicycle rack BR. The transport platform 10, in turn, comprises a base 11 with raised edges 12 around its entire perimeter; and a rail 13 that extends from two sides of the base 11. The base 11 is preferably rectangular in shape and has rounded edges; but may also be configured to have any other shape. In a preferred embodiment, the base 11 includes a first end 15a and a second end 15b that are parallel to each other and have the same length; and a first side 16a and a second side 16b that are parallel to each other and have the same length; wherein the length of the first and second sides 16a, 16b is greater than the length of the first and second ends 15a, 15b. The base 11 further comprises one or more holes 14a-141 that cross through the surface S or sides 16a, 16b of the base 11 that may be used to 1) either secure the transport platform 10 to the bicycle rack BR via one or more zip ties ZT; or 2) to serve as drainage for the base 11, in the event that water accumulates on the top surface of the base 11. The one or more holes 14a-141, are preferably located on the first and second sides 16a, 16b of the base 11 and on a corresponding nearby location on the surface S of the base 11 to allow for the tying of the base 11 to the bicycle rack BR via zip ties ZT or any equivalent thereof, including, but not limited to, cable ties. In other words, the one or more holes on the surface S of the base 11 should be adjacent to the corresponding one or more holes on the first and second sides 16a, 16b of the base 11 in order to facilitate the tying of the base 11 to the bicycle rack BR via zip ties ZT. It should be noted that holes 14a-14l may be used for both drainage and securing of the base 11 to the bicycle rack BR. It must also be noted that the base 11 can be manufactured from metal, plastic, wood or any other durable material with similar properties.

Figure 7A:
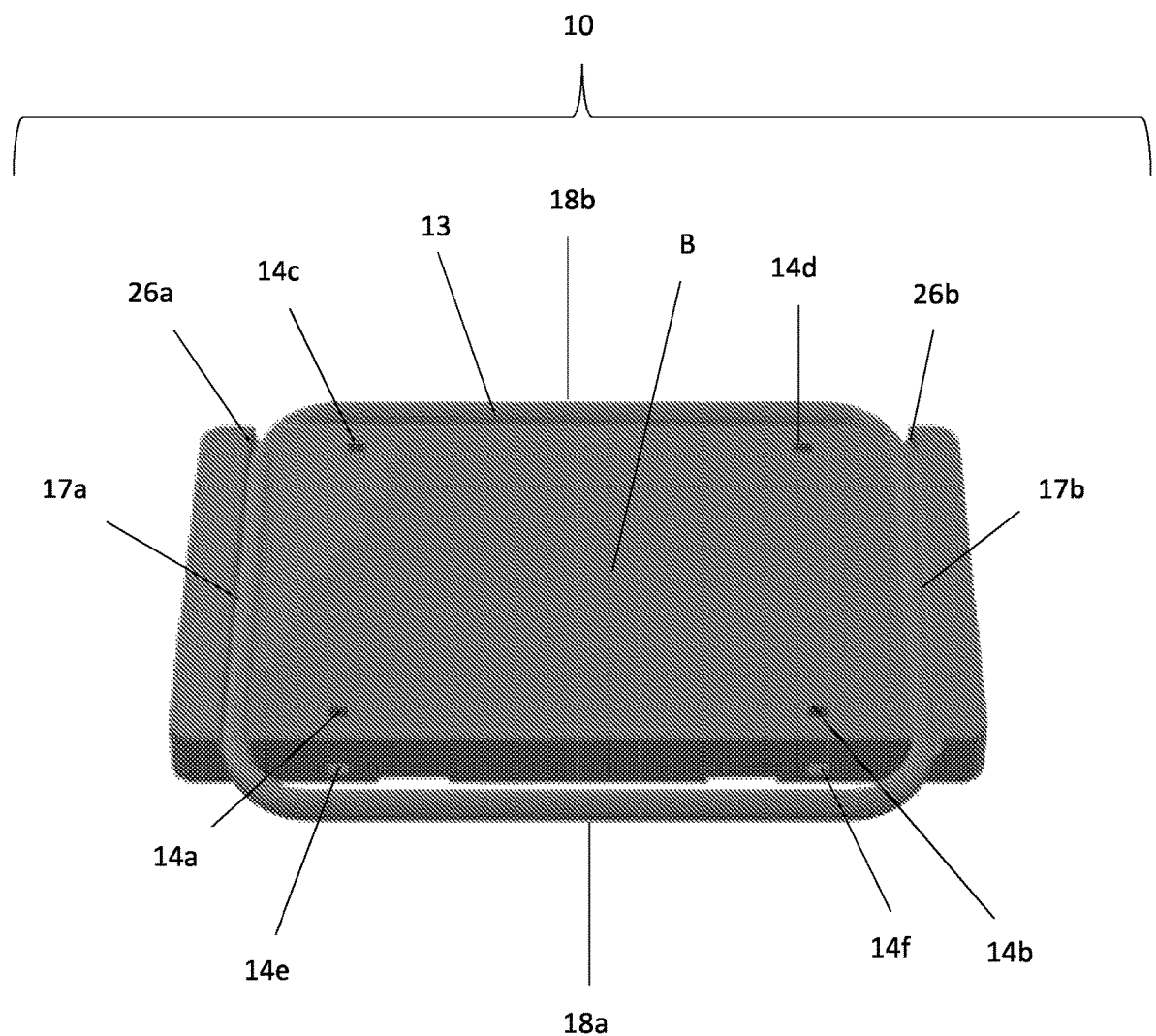
FIG. 7A shows a bottom view of the transport platform component of the attachment apparatus and/or system for securely attaching objects to a bicycle frame, in accordance with principles of the present disclosure.
Figure 7B:
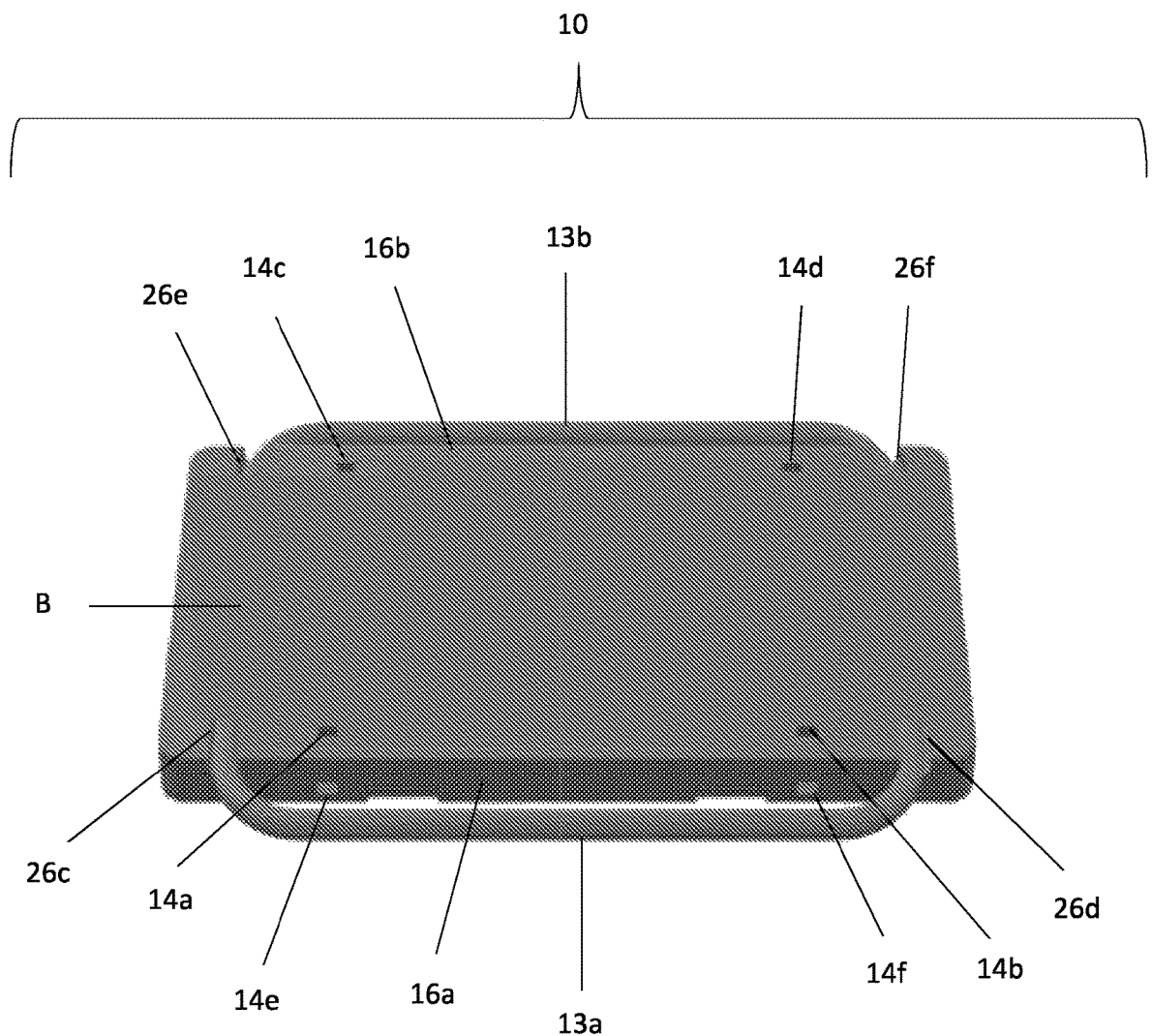
FIG. 7B shows a bottom view of another embodiment of the transport platform component of the attachment apparatus and/or system for securely attaching objects to a bicycle frame, in accordance with principles of the present disclosure.

Similarly, the rail 13 is preferably rectangular in shape with rounded edges; but may also have any other shape. The rail 13 can be manufactured from aluminum, plastic or any other durable material with similar properties. As shown in FIG. 7A, the rail 13 is preferably a single piece that is mechanically inserted or fitted into grooves 26a, 26b at the bottom B of the base 11. This configuration holds the base 11 in place and prevents it from rattling or moving. Notwithstanding, the attachment apparatus and/or system for securely attaching objects to a bicycle frame may also be configured to have one rail 13a attached to the base 11 via grooves 26c, 26d on the first side 16a of the base 11; and another rail 13b attached to the base 11 via grooves 26e, 26f on the second side 16b of the base 11, as shown in FIG. 7B. Lastly, it must be noted that the groves 26a, 26b or 26c, 26d may, but do not have to be, symmetric with each other.

In a preferred embodiment, the rail 13 includes a first end 17a and a second end 17b that are parallel to each other and have the same length; and a first side 18a and a second side 18b that are parallel to each other and have the same length; wherein the length of the first and second sides 18a, 18b is greater than the length of the first and second ends 17a, 17b. Additionally, the first and second sides 18a, 18b of the rail 13 protrude or extend beyond the perimeter of the first and second sides 16a, 16b of the base 11, thus creating a cavity or opening 24a, 24b between the corresponding first and second sides 16a, 16b of the base 11 and the corresponding first and second sides 18a, 18b of the rail 13. It must be noted, that in some embodiments the distance between the first and second sides 16a, 16b of the base 11 and the first and second sides 18a, 18b of the rail 13 must be smaller than the width of the handle of the U-shaped lock UL. Such configuration is necessary to prevent the U-shaped lock UL from falling through the cavity or opening 24a, 24b. Notwithstanding, the cavity or opening 24a, 24b between the corresponding first and second sides 16a, 16b of the base 11 and the corresponding first and second sides 18a, 18b of the rail 13, does not have to be symmetrical in size with each other. That is, the size of the cavity or opening 24a may be bigger than the size of the cavity or opening 24b and vice versa. Lastly, the first and second sides 18a, 18b of the rail 13 may include a strap ST that provides friction to the rail 13 and thus, provides further stability by preventing the U-shaped lock UL from moving and/or rattling. The strap ST may be manufactured from rubber, leather or any other material with a high coefficient of friction.

Figure 2:
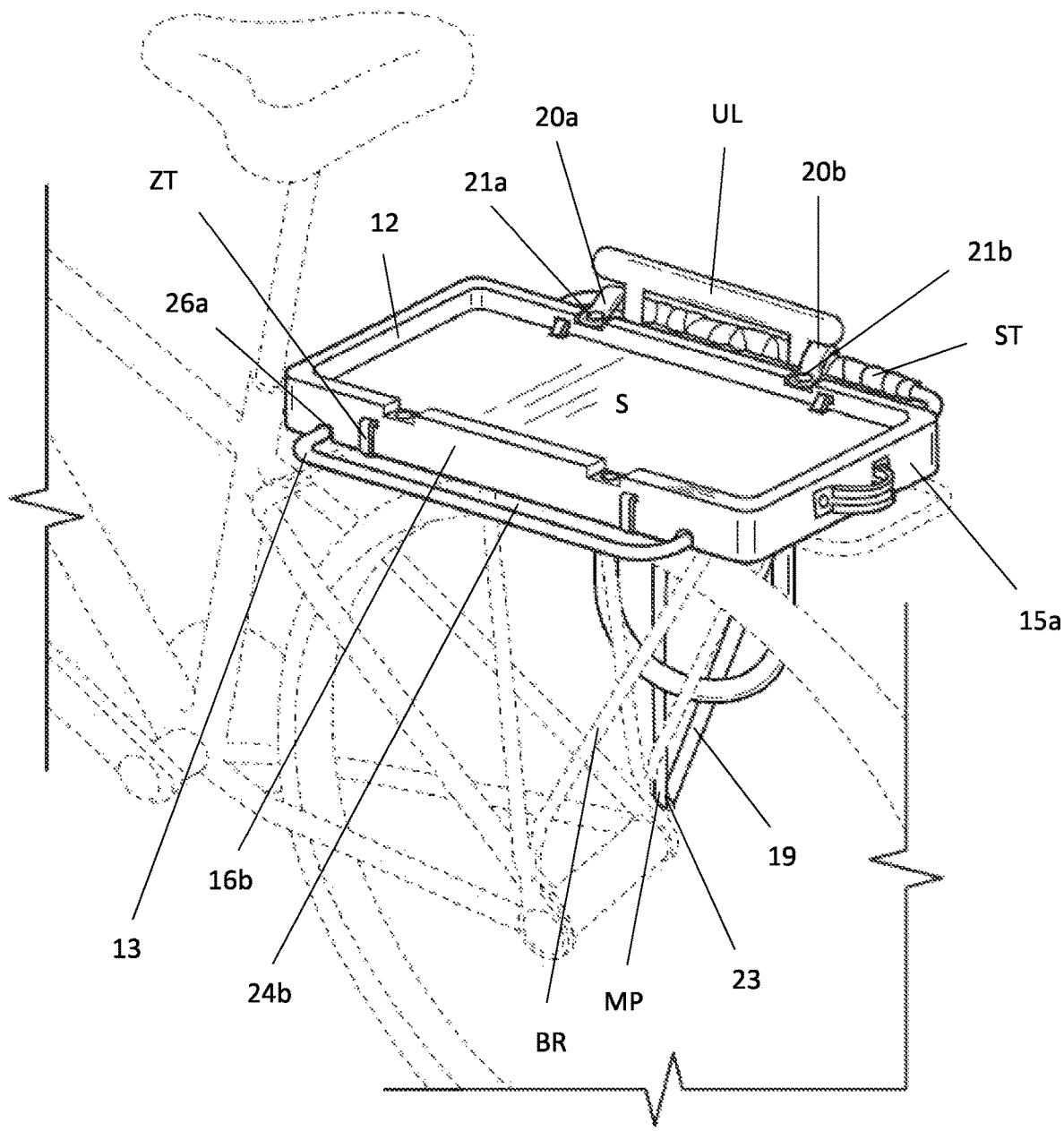
FIG. 2 shows a U-shaped lock attached to the right-side of the transport platform component of the attachment apparatus and/or system for securely attaching objects to a bicycle frame, in accordance with principles of the present disclosure
Figure 3:
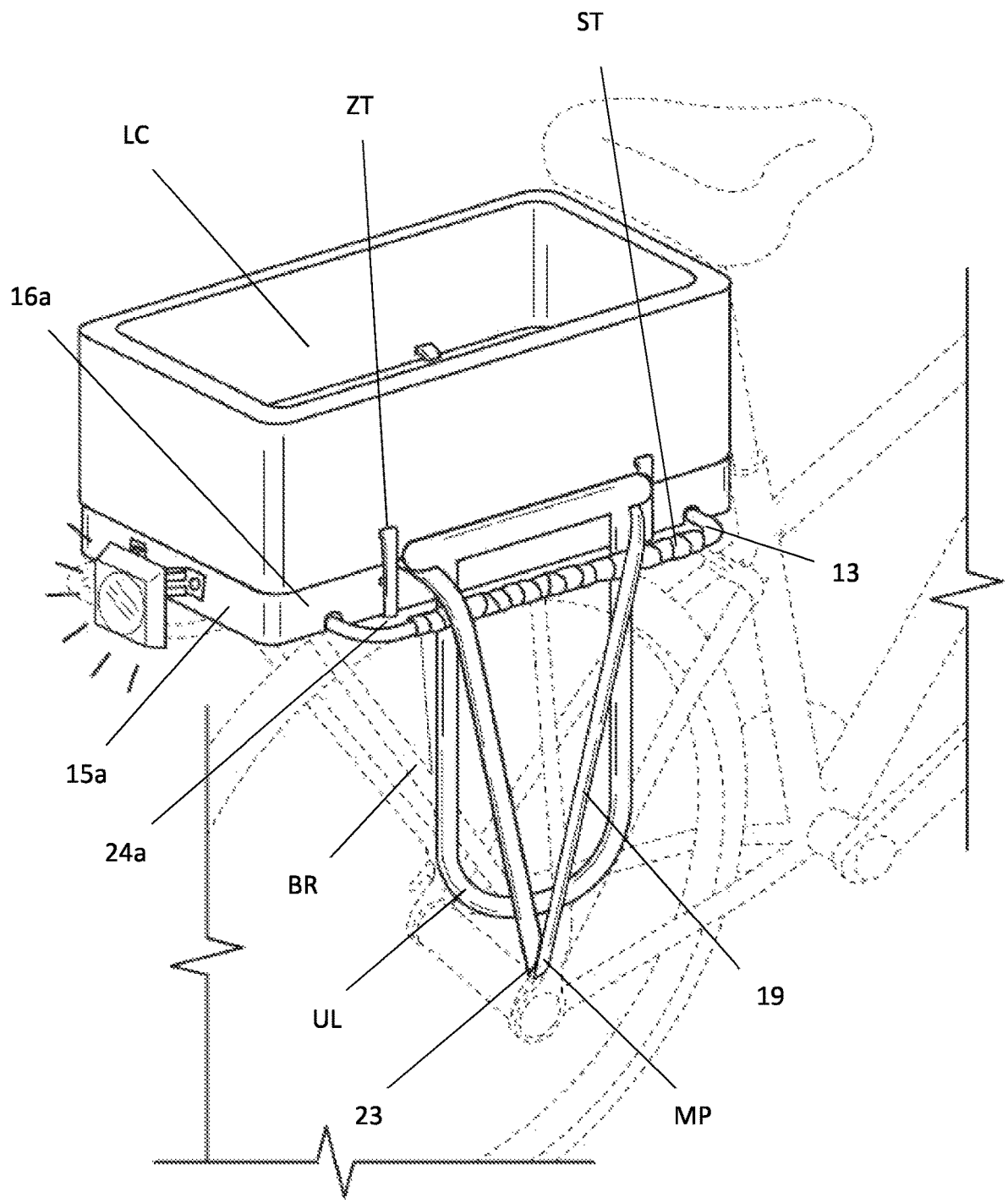
FIG. 3 shows a right-side perspective view of the attachment apparatus and/or system for securely attaching objects to a bicycle frame having an object attached to top of the transport platform component of said attachment apparatus and/or system, in accordance with principles of the present disclosure.

As shown in FIGS. 1-3, the attachment apparatus and/or system for securely attaching objects to a bicycle frame also comprises at least one connecting strap 19, having a first end 20a, and a second end 20b opposite to each other. The first end 20a of the connecting strap 19 is fastened to the base 11 via snap fastener 21a. The second end 20b is then looped over an attachment point 23 (i.e., any lower portion of the bicycle rack that may serve as support for the connecting strap) in the bicycle rack BR such that the midpoint MP of the connecting strap 19 is securely attached to the bicycle rack BR. The second end 20b is then fastened to the base 11 via snap fastener 21b. It should be noted that the first end 20a and second end 20b of the connecting strap 19 are both folded over the rail 13 (i.e., they are not inserted through the cavity 24a, 24b) while being snapped into the corresponding snap fasteners 21a, 21b. This creates a triangular shape, akin to a holster, which holds the U-shaped lock UL in place in the x, y and z dimensions, thus preventing said lock from moving and rattling. The connecting strap 19 may be manufactured from any material that is foldable and durable, such as, but not limited to, rubber, leather or any other material with a high co-efficient of friction. Alternatively, instead of fastening the second end 20b to the base 11 via snap fastener 21b, the second end 20b may be fastened to the base 11 via snap fastener 21d. This configuration allows the connecting strap 19 to work as a bungee cord like device to secure objects on the surface S of the base 11 of the platform for transport 10.

Accordingly, the shape of the transport platform 10, with a rail 13 that protrudes from the side of the base 11, creates a cavity or opening 24 that holds an object when the transport platform 10 is mounted on a bicycle rack BR. The connecting strap 19 will then firmly secure the U-shaped lock UL in place. To retrieve the U-shaped lock UL, the cyclist would only need to pull U-shaped lock UL out of the cavity or opening 24. It should be noted that the snap fasteners 21a, 21b, 21c, 21d are preferably mounted on the raised edges 12 of the base but may also be mounted on the first and second sides 16a, 16b of the base 11; or on the first and second ends 15a, 15b of the base; or on both.

Figure 4:
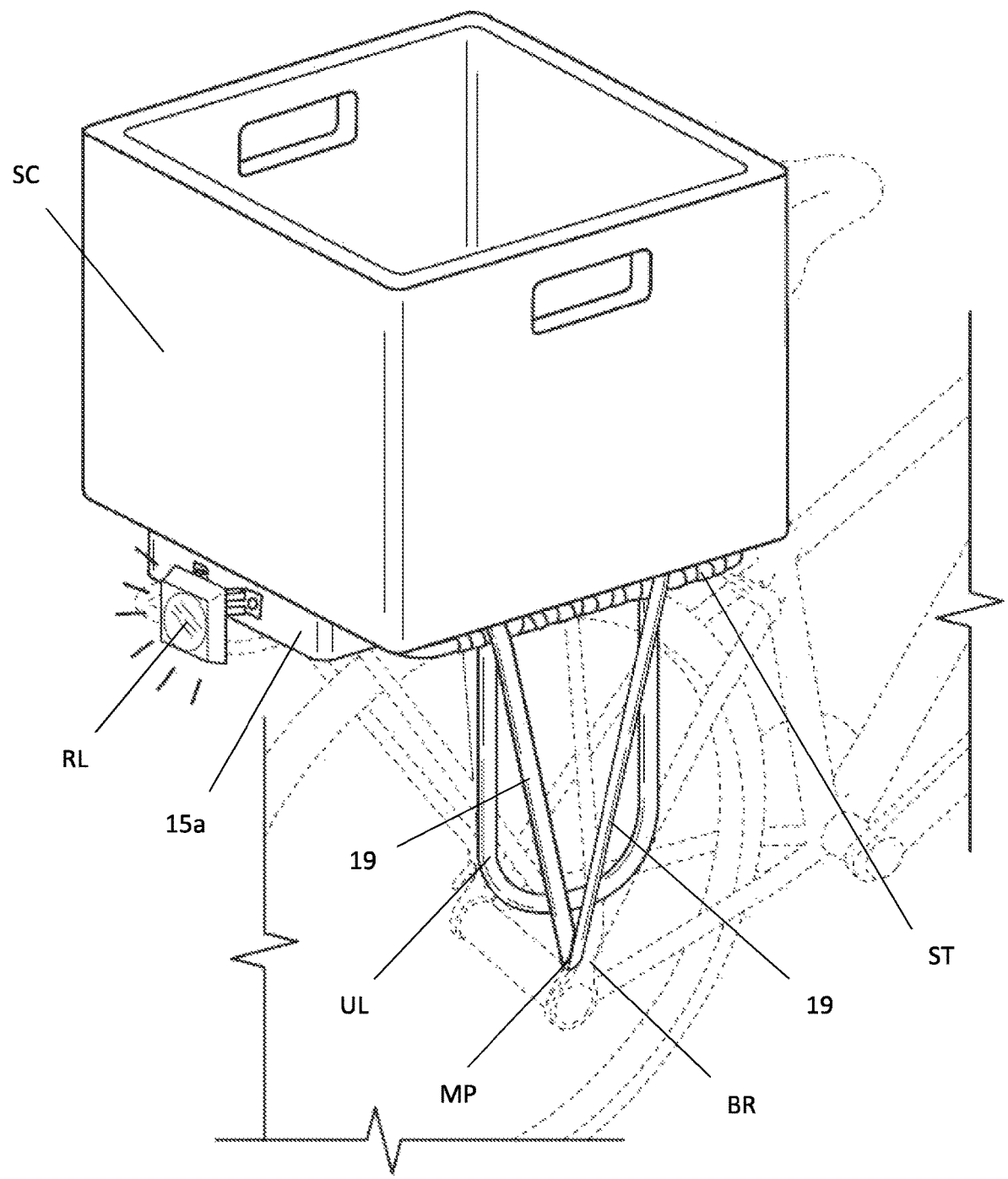
FIG. 4 shows a right-side perspective view of the attachment apparatus and/or system for securely attaching objects to a bicycle frame having a different object attached to top of the transport platform component of said attachment apparatus and/or system, in accordance with principles of the present disclosure.

As shown in FIGS. 3-4, attachments like locking containers LC or storage containers SC of various sizes, lights, solar-panel chargers, etc., can be snapped via the snap fasteners 21a, 21b, 21c, 21d onto the transport platform 10. Alternatively, the attachments can be secured to the platform 10 via one or more screws, threaded inserts or similar fastening mechanism. This modular approach supports all sorts of attachments including ones that support additional storage for hauling groceries or other items.

Figure 5:
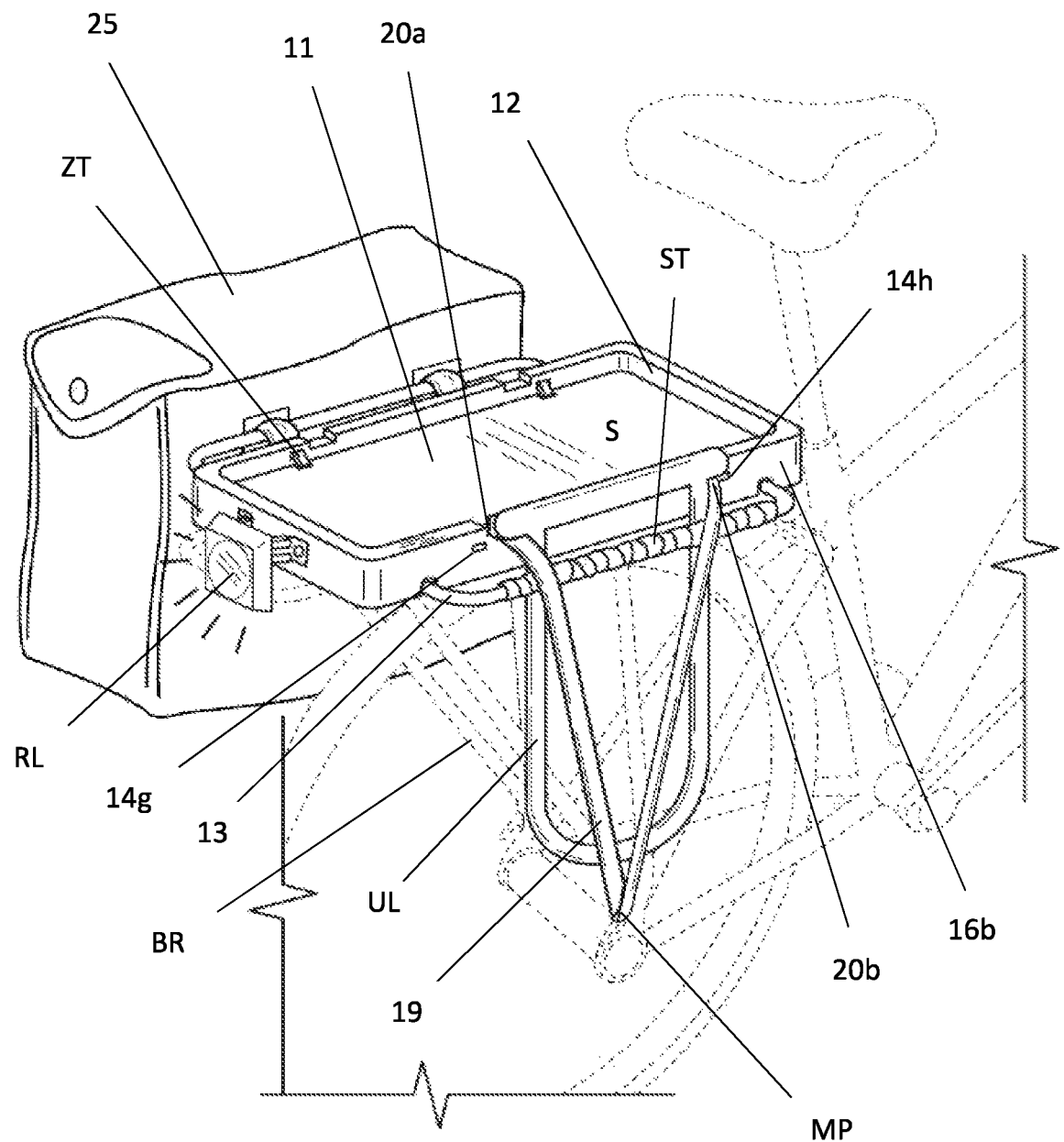
FIG. 5 shows a U-shaped lock attached to the right-side of the transport platform and supported by connecting straps as well as a pannier bag attached to the left-side of the transport platform, in accordance with principles of the present disclosure.
Figure 6:
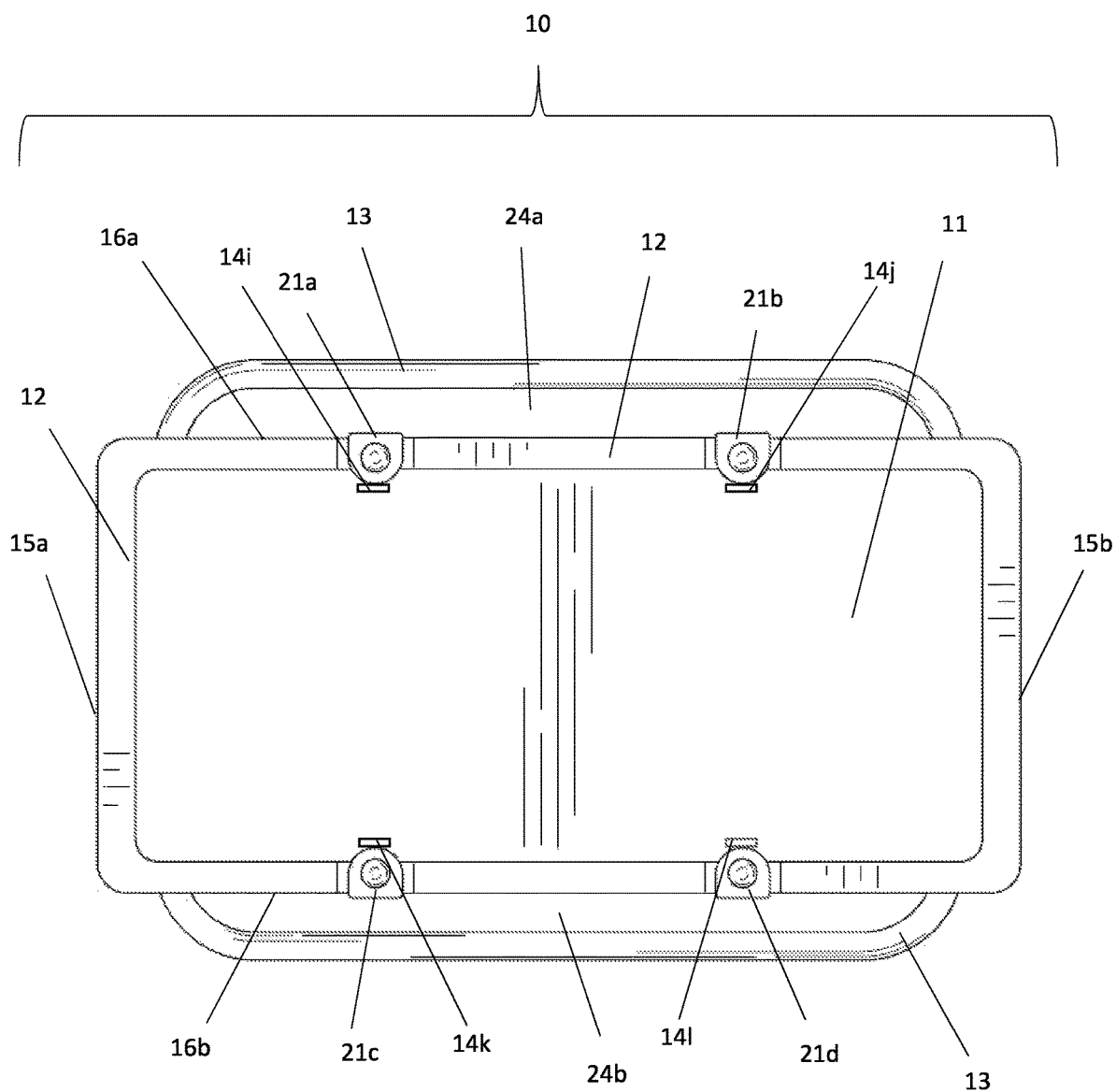
FIG. 6 shows a top view of the transport platform component of the attachment apparatus and/or system for securely attaching objects to a bicycle frame, in accordance with principles of the present disclosure.

As shown in FIG. 5, the transport platform 10 also enables the rider to mount saddlebags or panniers 25. The side rails on the transport platform 10 permit the use of saddle bags or panniers 25 on one or both sides of the base 11, unlike other systems that support storage on top of the rack and prevent the use of saddlebags. Moreover, the existing functionality of the bicycle rack BR is not compromised with the attachment apparatus and/or system for securely attaching objects to a bicycle frame. For example, a light bracket 27 may be mounted on the first end 15a of the base 11 so that riders can also attach a rear light RL for visibility.

As shown in FIGS. 1, 2, 5, and 6, and as previously discussed, the base 11 also comprises a raised edge 12 around the entire perimeter of said base 11. This raised edge 12 ensures that objects placed on the top of the base 11 do not slide off the transport platform 10. In effect, it provides a passive way to secure objects on the transport platform 10. Coupled with a bungee cord, the object would be securely held in place.

Figure 8:
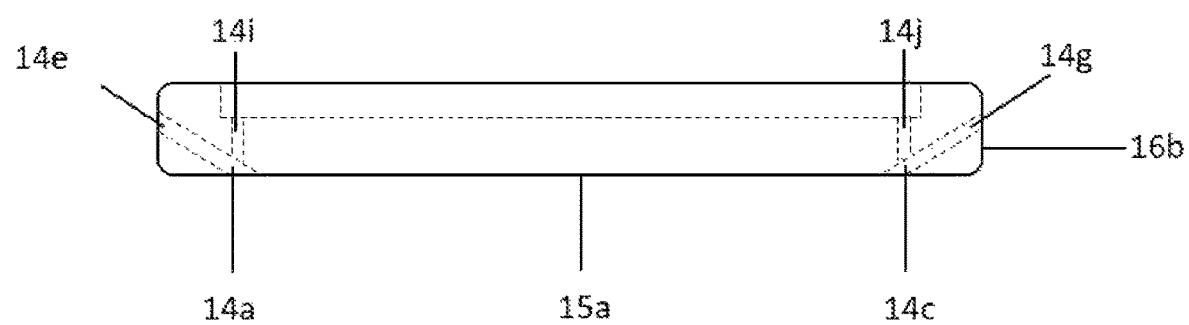
FIG. 8 shows an orthogonal view of the transport platform component of the attachment apparatus and/or system for securely attaching objects to a bicycle frame, in accordance with principles of the present disclosure.

FIG. 8 shows an orthogonal view of the base 11 of the transport platform 10 depicting the one or more holes used for drainage or for mounting the base 11 to the bicycle rack BR. In one embodiment of the transport platform 10, the cable ties or zip ties ZT may be inserted through one or more diagonal holes 14e, 14f, 14g, 14h on the first and second sides 16a, 16b of the base 11 that connect with corresponding holes 14a, 14b, 14c, 14d respectively, on the bottom surface of the base 11, as shown in FIG. 8. It should be noted that the one or more diagonal holes 14e, 14f, 14g, 14h on the first and second sides 16a, 16b of the base 11 preferably have a 45° angle. When the cable ties or zip ties ZT are inserted through the one or more diagonal holes in the aforementioned configuration they do not take up any of the space on the top surface of the base 11.

Figure 9:
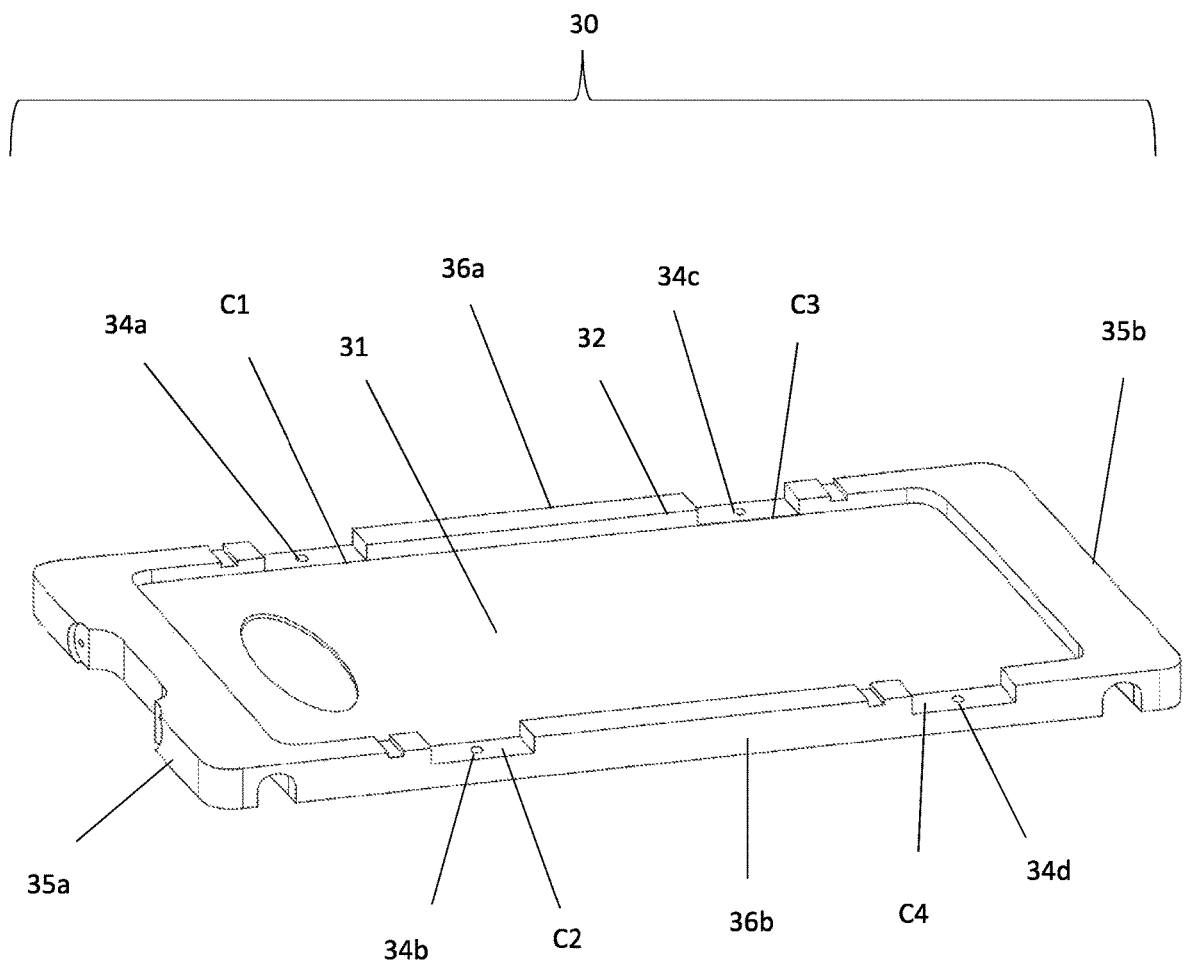
FIG. 9 shows a perspective view of a second embodiment of the transport platform, in accordance with principles of the present disclosure.
Figure 10:
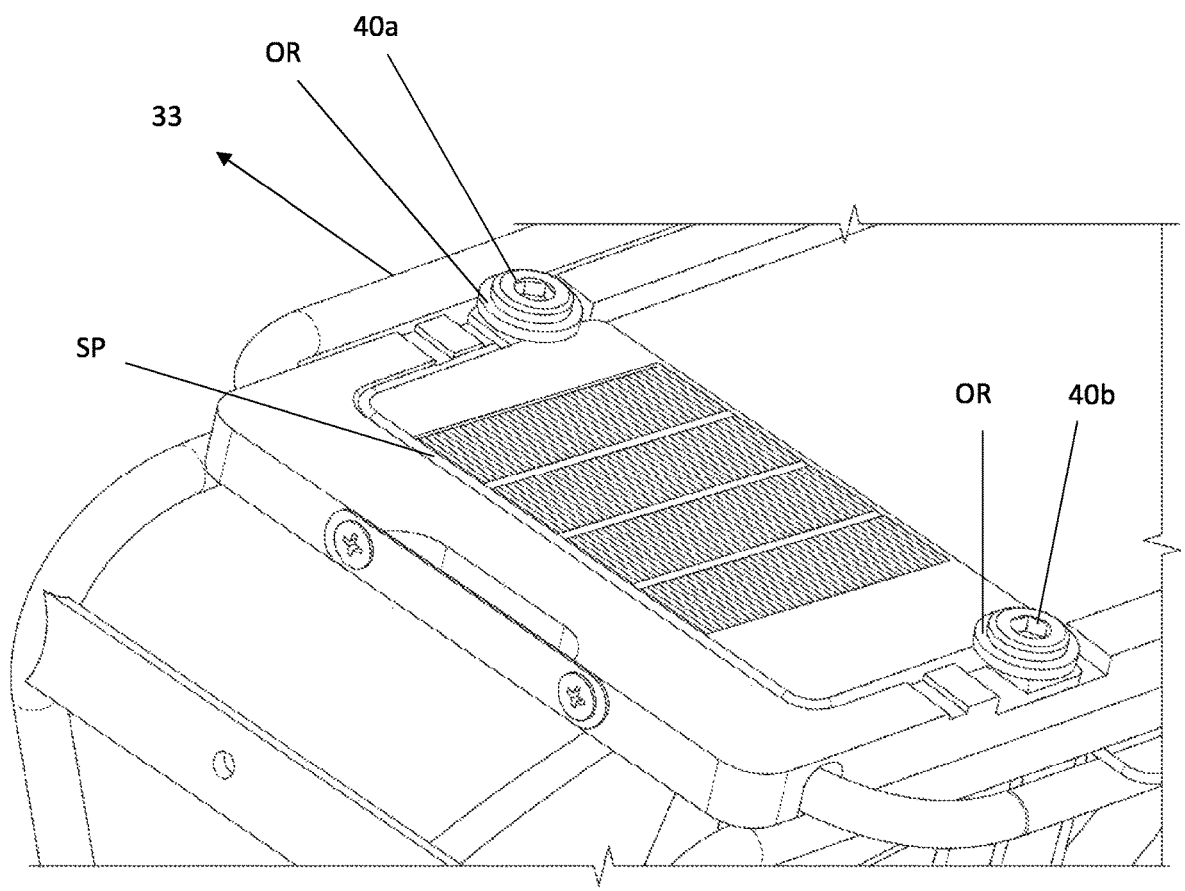
FIG. 10 shows a perspective view of the solar panel component of the second embodiment of the transport platform, in accordance with principles of the present disclosure.

FIGS. 9-16 refer to an alternate embodiment of the attachment apparatus and/or system for securely attaching objects to a bicycle frame comprising a transport platform 30 that is configured to be attached to the top of the bicycle rack BR. The transport platform 30, in turn, comprises a base 31 with raised edges 32; and a rail 33 that extends from two sides of the base 31. In this embodiment, however, the raised edges 32 include one or more cutouts C1, C2, C3, C4 at different locations along the edge of the base 31, as shown in FIG. 9. Accordingly, the base 31 does not have any raised edges in the areas where the cutouts C1, C2, C3, C4 are located, thereby giving the platform 30 the appearance of a platform with intermittent raised edges. The purpose of these cutouts is to support different types of attachments. This modular design of the platform 30 ensures that the attachments can be independently created, modified, replaced, or exchanged with other attachments. Ultimately, this design ensures bicycle riders can transport a variety of objects.

Moreover, the base 31 includes a first end 35a and a second end 35b that are parallel to each other and have the same length; and a first side 36a and a second side 36b that are parallel to each other and have the same length, wherein the length of the first and second sides 36a, 36b is greater than the length of the first and second ends 35a, 35b. The base 31 further comprises one or more holes 34a-34d that cross through the surface S2 or sides 36a, 36b of the base 31 that may be used to 1) either secure the transport platform 30 to the bicycle rack BR via one or more screws 40a, 40b or zip ties; or 2) to serve as drainage for the base 31. The one or more holes 34a-34d are individually located in each of the cutouts C1, C2, C3, C4 of the base 31. As such, hole 34a is located in cutout C1; hole 34b is located in cutout C2; hole 34c is located in cutout C3; and hole 34d is located in cutout C4. The one or more holes 34a-34d include a threaded insert for receiving the one or more screws 40a, 40b.

As with previous embodiments, the rail 33 is preferably a single piece that is mechanically inserted or fitted into grooves at the bottom of the base 31 in the manner described for the embodiment shown in FIG. 7A. Notwithstanding the foregoing, the rail 33 can also be comprised of separate pieces as described for the embodiment shown in FIG. 7B. Moreover, the rail 33 includes a first end 37a and a second end 37b that are parallel to each other and have the same length; and a first side 33a and a second side 33b that are parallel to each other and have the same length; wherein the length of the first and second sides 33a, 33b is greater than the length of the first and second ends 37a, 37b. Additionally, the first and second sides 33a, 33b of the rail 33 protrude or extend beyond the perimeter of the first and second sides 36a, 36b of the base 31, thereby creating a cavity or opening 44a, 44b between the corresponding first and second sides 36a, 36b of the base 31 and the corresponding first and second sides 33a, 33b of the rail 33.

In addition to the attachments already disclosed (e.g., locking containers LC and storage containers SC), the transport platform 30 may have additional attachments such as a solar charging panel SP; and different embodiments of a caddy attachment CA1, CA2, as shown in FIGS. 10-16. Particularly, the solar panel SP comprises one or more photovoltaic panels PP to collect solar energy and a battery SB to store solar energy. The solar panel SP is configured to fit within the raised edges 32 of the base 31; and may include one or more holes SO1, SO2 located on the side of the panel and having threaded inserts configured to receive the one or more screws 40a, 40b or similar fastening mechanisms. The one or more holes SO1, SO2 on the solar panel SP correspond with two of the holes 34a, 34b on the cutout portion C1, C2 on the edge of the base 31. As such, when the screws are inserted through the one more holes SO1, SO2 and the corresponding holes 34a, 34b on the edge of the base 31, the solar panel is tightly secured to the base 31. O-rings OR may also be used when securing the solar panel SP to the base 31 via the one or more screws 40a, 40b.

The caddy attachments CA1, CA2, on the other hand, are structures configured to hold the U-shaped lock UL in place in the x, y, and z dimensions. Particularly, the first embodiment of the caddy attachment CA1 comprises a U-shaped bottom portion USP that includes a first bar 41a having a first end E1 and a second end E2; and a second bar 41b also having a first end E3 and a second end E4. The first and second bars 41a, 41b are parallel to each other. The caddy attachment CA1 further comprises a rim R that is preferably rectangular and has rounded edges but may have any other shape. The rim R includes a top end R1 and a bottom end R2, wherein said top and bottom ends R1, R2 are parallel to each other and have the same length. The rim R further includes a first side R3 and second side R4, wherein said first and second sides R3, R4 are parallel to each other and have the same length. Moreover, the first and second sides R3, R4 have end portions that are welded or connected to end portions of the top and bottom ends R1, R2; and that the length of the top and bottom ends R1, R2 is greater than the length of the first and second sides R3, R4. It should also be noted that the bottom U-shaped portion USP is perpendicularly connected or welded to the rim R. Specifically, the first and second ends E1, E2 of the first bar 41a may be perpendicularly welded or connected to the top end R1; or alternatively to the first and second sides R3, R4 of the rim R (i.e., first end E1 welded to second side R4 and second side E2 welded to first side R3). Similarly, the first and second ends E3, E4 of the second bar 41b may be perpendicularly welded or connected to the bottom end R2; or alternatively to the first and second sides R3, R4 of the rim R (i.e., first end E3 welded to second side R4 and second side E4 welded to first side R3). This configuration creates a structure having an opening OC that serves as the means of entry into the caddy attachment CA1.

Figure 11:
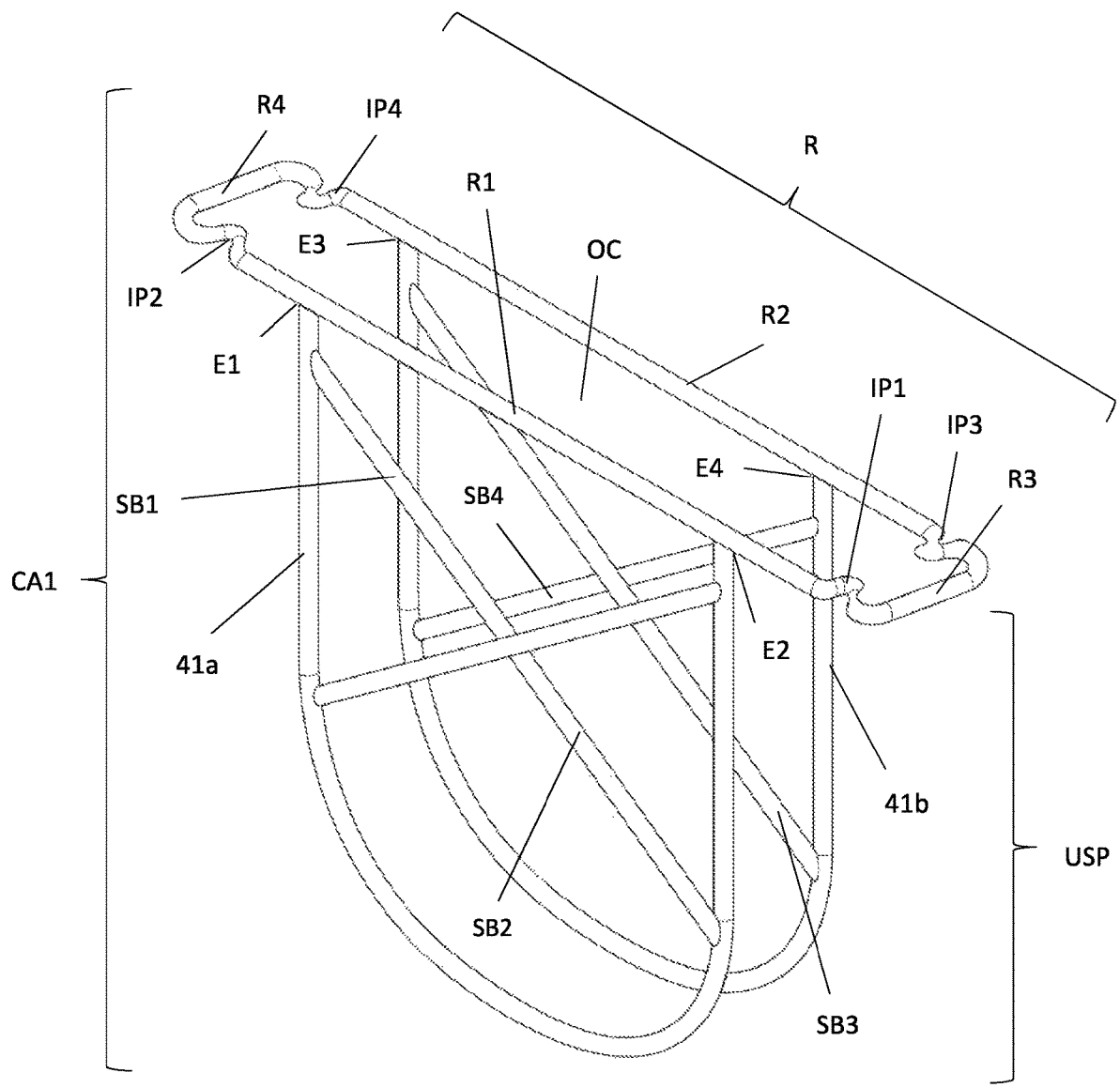
FIG. 11 shows a first embodiment of a caddy attachment to be used with the second embodiment of the transport platform, in accordance with principles of the present disclosure.
Figure 12:
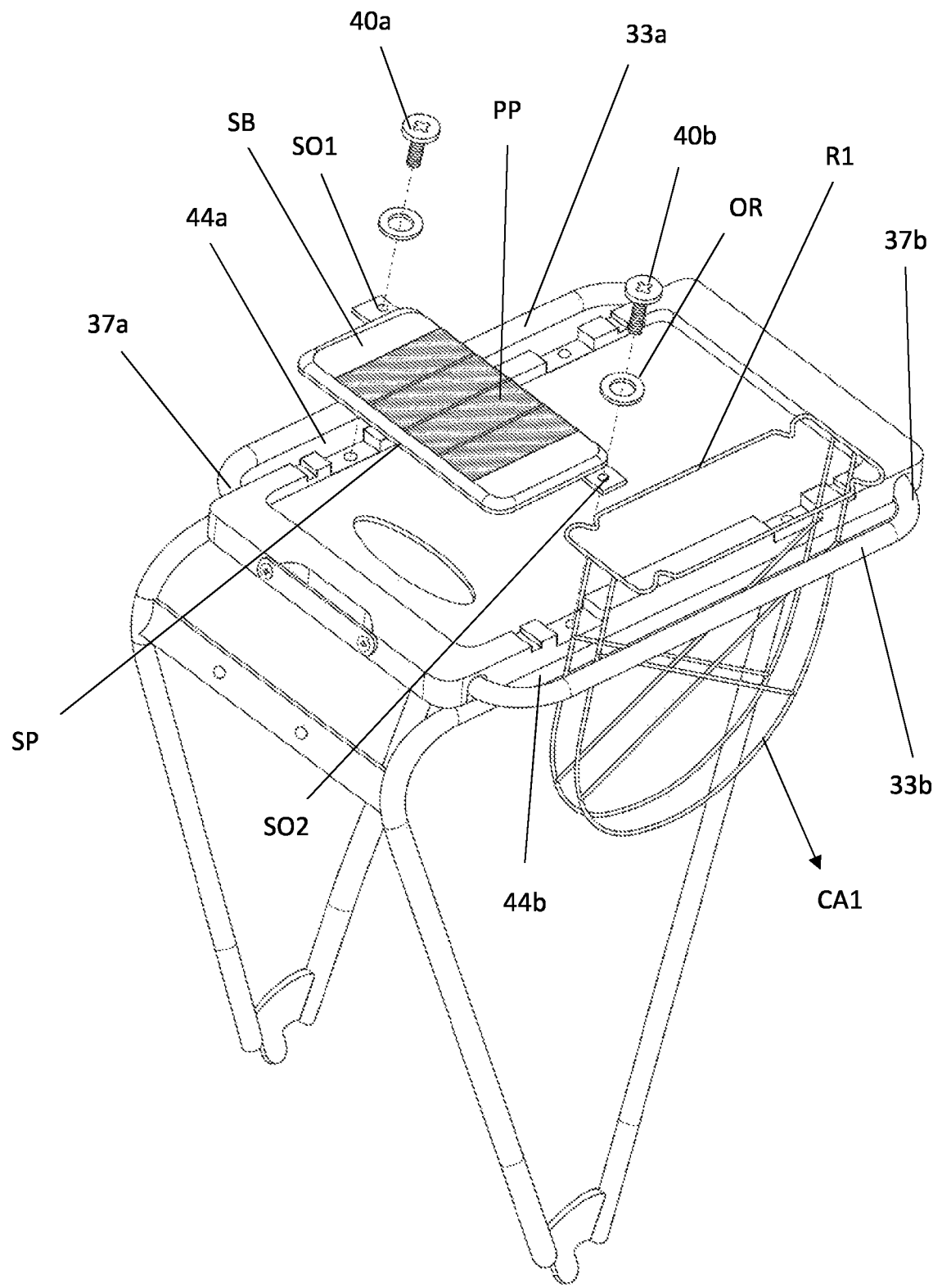
FIG. 12 shows a perspective view of all components of the second embodiment of the transport platform, in accordance with principles of the present disclosure.

Additionally, the caddy attachment CA1 includes one or more support bars SB1, SB2 connecting opposing portions of the first bar 41a; and one or more support bars SB3, SB4 connecting opposing portions of the second bar 41b. The support bars provide support and stability to the caddy attachment CA1 and help in stabilizing the U-shaped lock UL when inserted via the opening OC of the caddy attachment CA1. The caddy attachment CA1 is therefore akin to a holster that holds the U-shaped lock UL in place in the x, y and z dimensions and prevents said lock from moving and rattling. The support bars SB1, SB2, SB3, SB4 should preferably be diagonally connected or welded to the opposing portions of the corresponding bar 41a, 41b; but may also be connected in any other manner that provides stability to the caddy attachment CA1. Moreover, it is preferable that the support bars SB1, SB2, SB3, SB4 that are diagonally connected to the opposing portions of the corresponding bar 41a, 41b do not be parallel to each other. In other words, support bars SB1, SB2 in bar 41a and support bars SB3, SB4 in bar 41b should have the appearance of the letter "X", as shown in FIG. 11.

Figure 13:
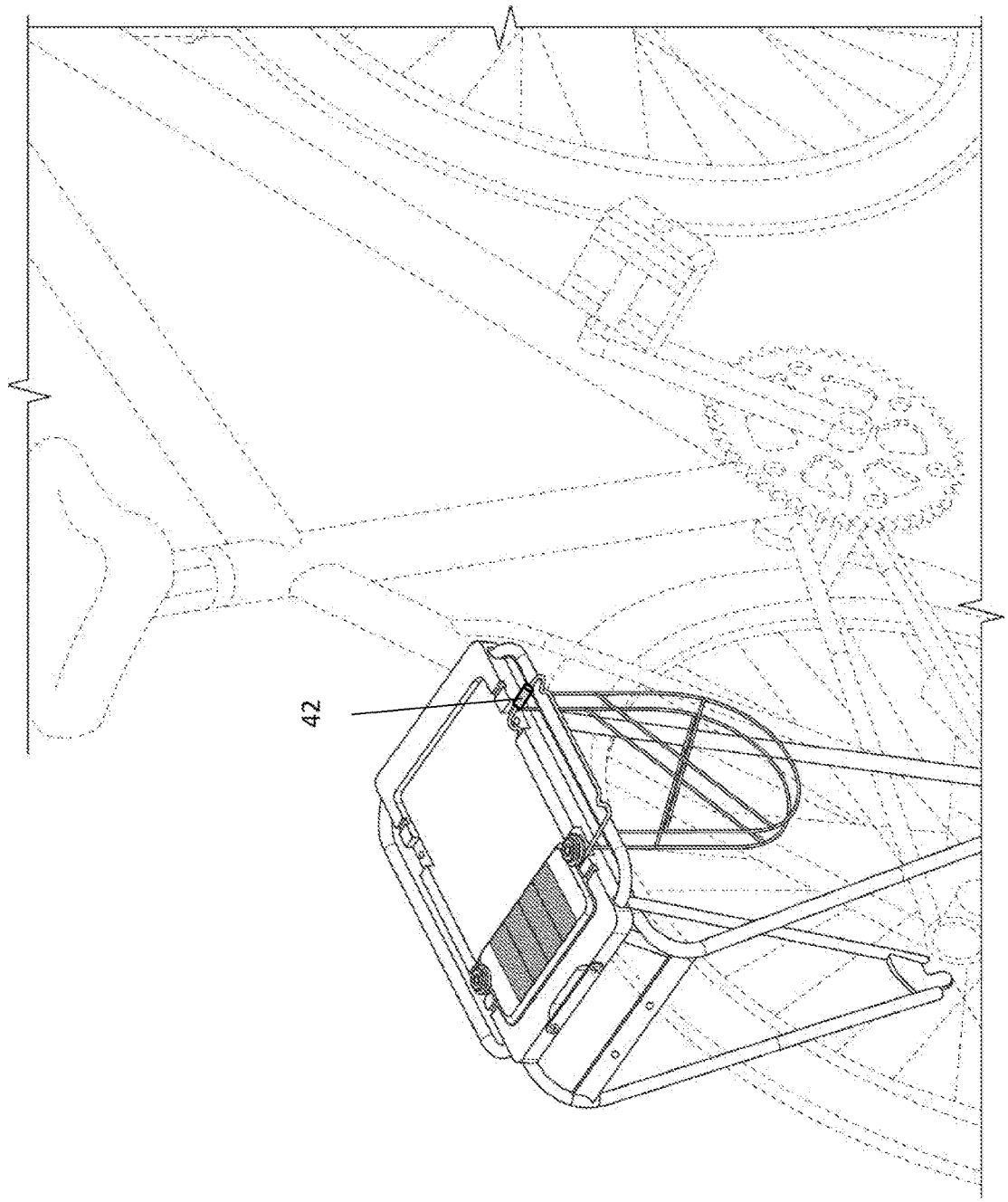
FIG. 13 shows the first embodiment of the caddy attachment installed on the second embodiment of the transport platform, in accordance with principles of the present disclosure.

The caddy attachment CA1 is configured to be inserted in the opening 44a or 44b between the base 31 and the rail 33. When inserted through the opening 44a, 44b, the top end R1 of the rim R will rest on the edge of the base 31; and the bottom end R2 will rest on the rail 33. In other words, a first portion of the rim R of the caddy attachment will be resting on (or secured to) the cutout portions C1, C3 or C2, C4 of the base 31 and a second portion of the rim R will be resting on the rail 33. The rim R has one or more indented portions IP1, IP2, IP3, IP4 that are configured to fit in the cutouts C1, C3 or C2, C4 of the base 31. The indented portions IP1, IP2, IP3, IP4 prevent the holes 34b, 34d or 34a, 34c from being covered when the caddy attachment CA1 is resting on the base 31 and rail 33, thereby providing access to the one or more screws required to secure the caddy attachment CA1 to the platform 30. The shape of the indented portions IP1, IP2, IP3, IP4 permits corresponding screws to access the holes 34a-34d in the base 31 and allows a portion of the screws to secure the rim R to the base 31. O-rings OR can be used to facilitate tightening of the rim R to the base 31. It should also be noted that the top end R1 and bottom end R2 of the rim R should preferably have a length that is similar to one of the raised edges 32 of the base 31 that are adjacent to the holes 34b, 34d or 34a, 34c on the cutout portions C1, C3 or C2, C4. This length, in combination with the indented portions IP1, IP2, IP3, IP4 will allow the indented portions IP1, IP2, IP3, IP4 to be fitted on the corresponding raised edge 32, as shown in FIG. 13.

Figure 14:
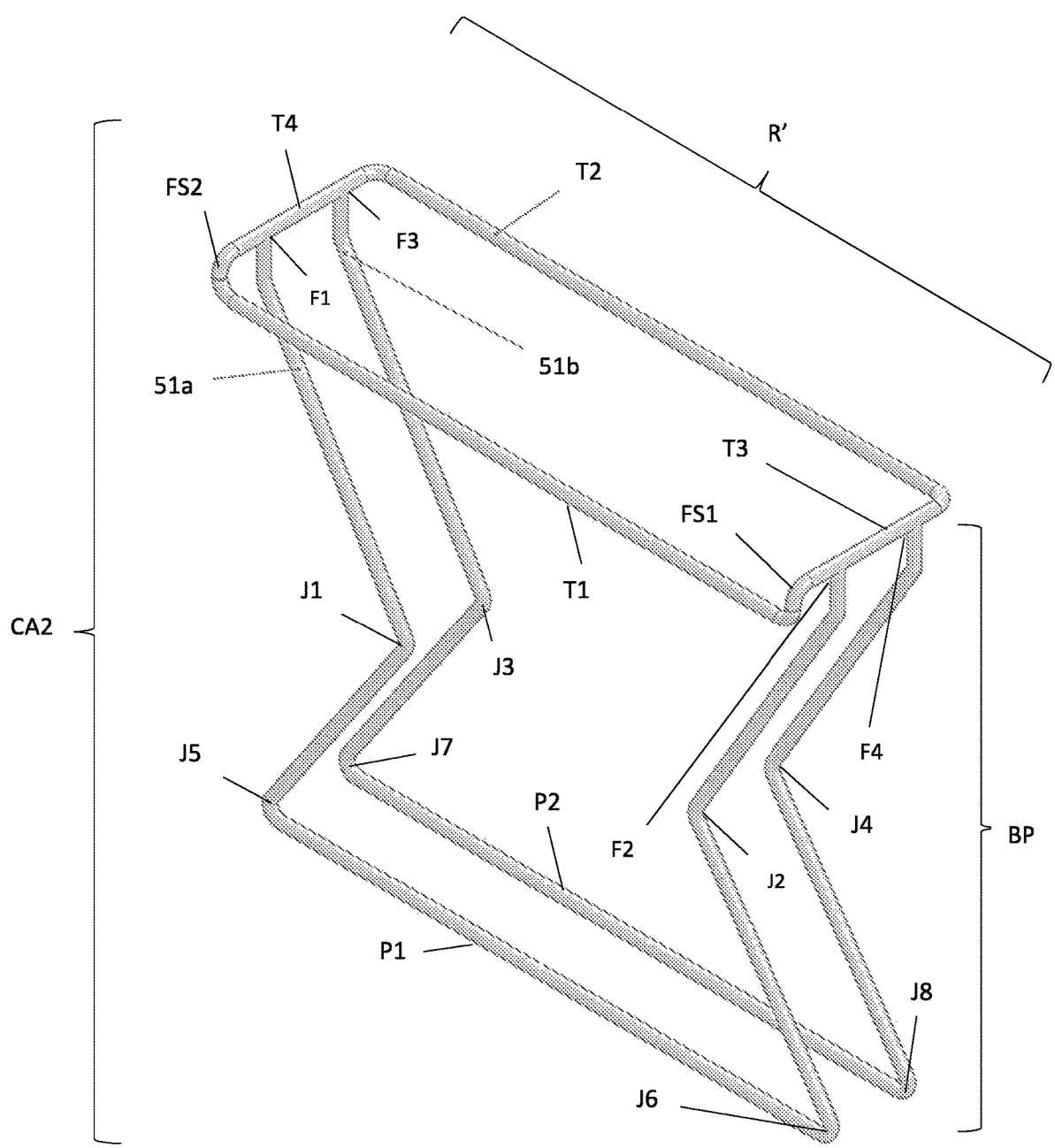
FIG. 14 shows a second embodiment of the caddy attachment, in accordance with principles of the present disclosure.
Figure 15:
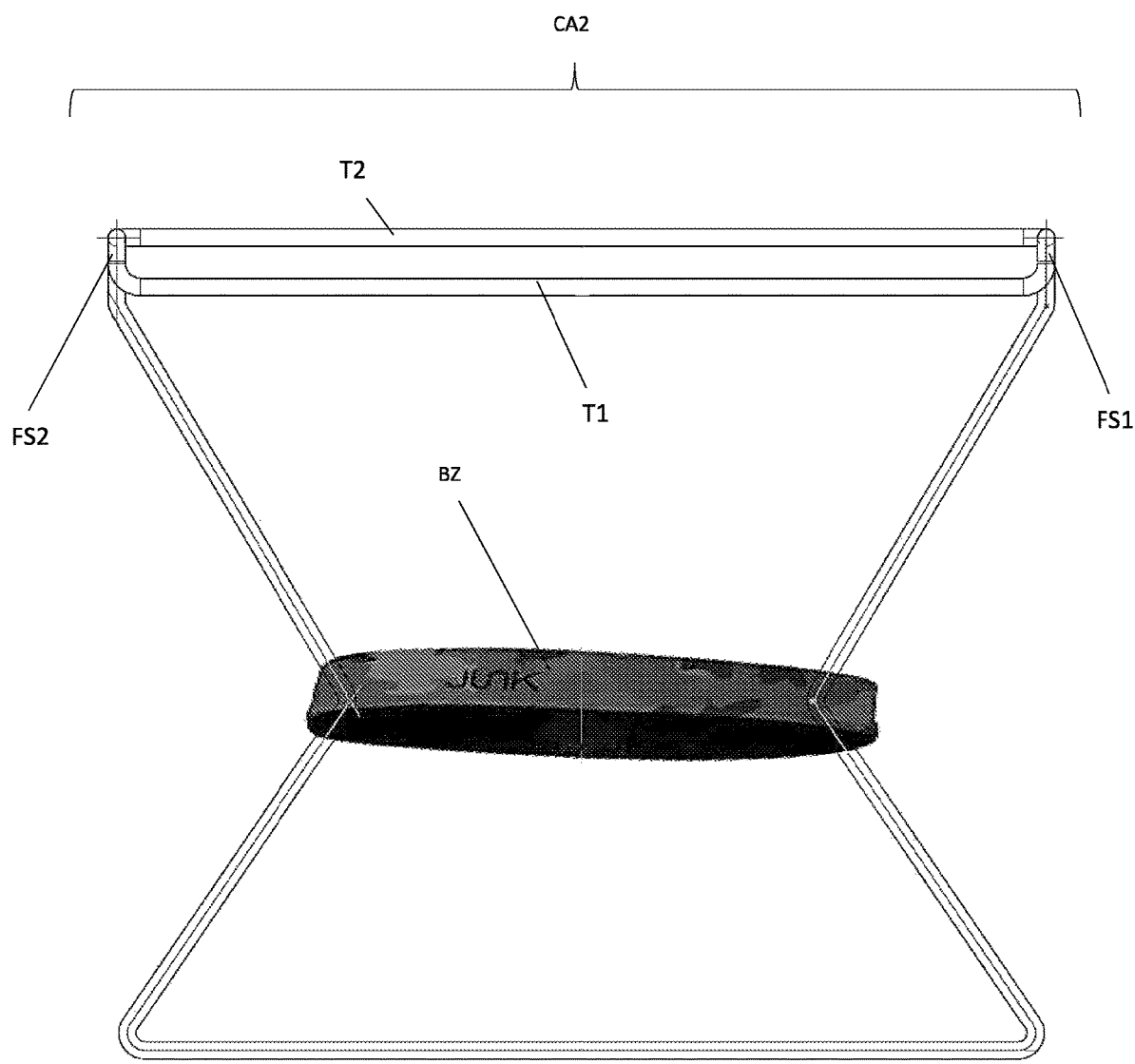
FIG. 15 shows a front view of the second embodiment of the caddy attachment with an elastic band, in accordance with principles of the present disclosure.
Figure 16:
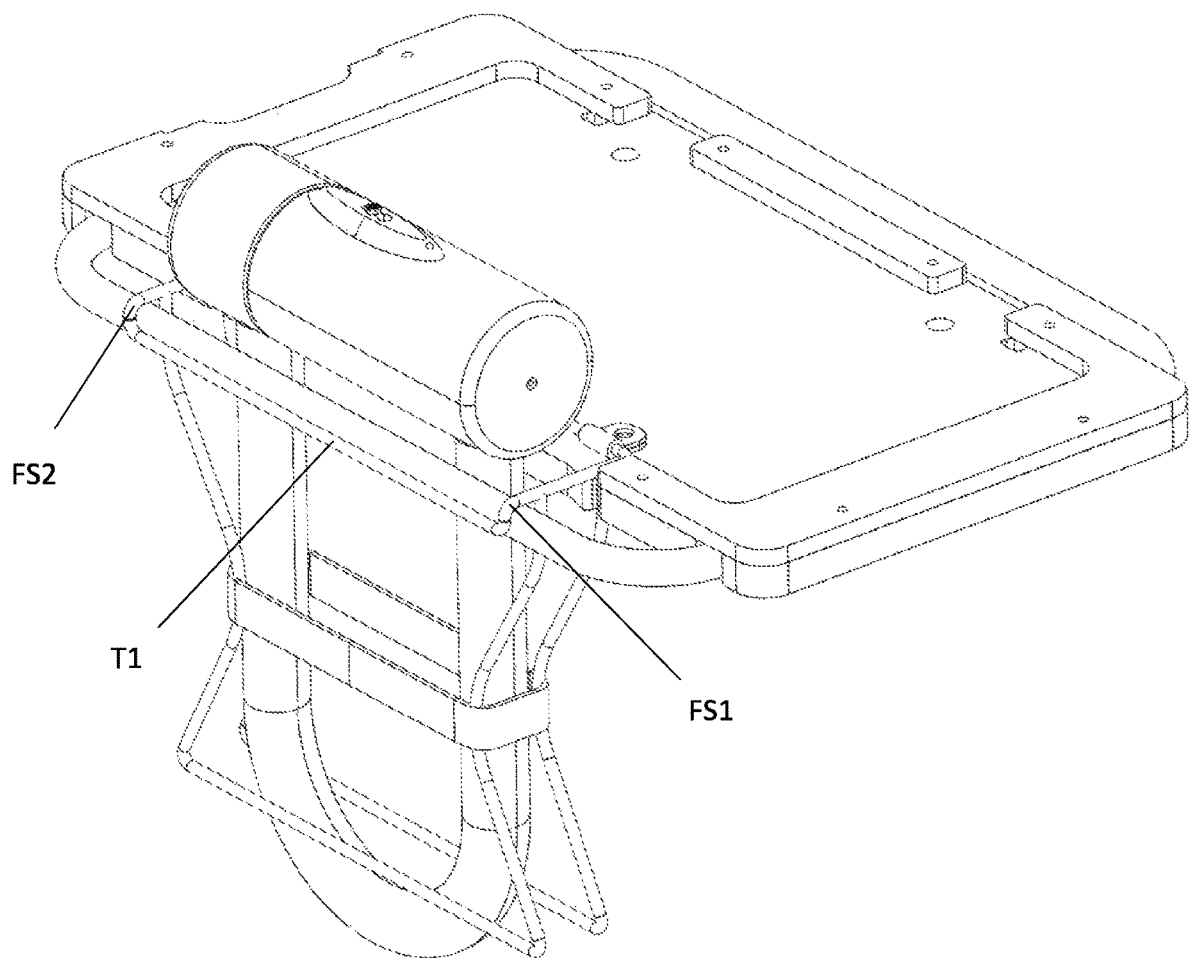
FIG. 16 shows the second embodiment of the caddy attachment installed on the second embodiment of the transport platform, in accordance with principles of the present disclosure.

FIGS. 14-16 show the second embodiment of the caddy attachment CA2. In this embodiment, the caddy attachment comprises a bottom portion BP that includes a first bar 51a having a first end F1 and a second end F2; and a second bar 51b also having a first end F3 and a second end F4. The first and second bars 51a, 51b are parallel to each other. The caddy attachment CA2 further comprises a rim R' that is preferably rectangular and has rounded edges but may have any other shape. The rim R' includes a top end T1 and a bottom end T2, wherein said top and bottom ends T1, T2 are parallel to each other and have the same length. The top end T1 may include one or more folded sections FS1, FS2 that permit the rim R' to fit over the rail 33 of the transport platform 30, as shown in FIG. 16 (i.e., the rail 33 fits in the space between the folded section of the rim R' and the first bar 51a). The bottom end T2, on the other hand, fits over one of the raised edges 32 of the transport platform 30 and is secured thereto via one or more screws inserted through the one or more holes 34a-34d, as also shown in FIG. 16.

The first and second bars 51a, 51b in the bottom portion BP preferably include one or more junctures J1-J8 that give the bottom portion of the caddy attachment CA2 a zigzag shape, as shown in FIG. 14. Nonetheless, the bottom portion BP may have any other shape. As a result of the zigzag shape, the first and second bars 51a, 51b, (taking as a starting point the first and second ends F1, F2, F3, F4) initially tilt downwardly and away from the perimeter of the rim R' and towards the middle or center of the rim R' until reaching a first set of junctures J1-J4. Once at the first set of junctures J1-J4, the first and second bars 51a, 51b then tilt downwardly and away from the center of the rim R' until reaching a second set of junctures J5-J8. Once there, the first and second bars 51a, 51b move horizontally towards the center of the rim R' and form the base portion P1, P2 of the caddy attachment CA2. The zigzag shape provides a structure akin to a holster for holding the U-shaped lock UL in place in the x, y and z dimensions, thus preventing said lock from moving and rattling.

The rim R' further includes a first side T3 and second side T4, wherein said first and second sides T3, T4 are parallel to each other and have the same length. Moreover, the first and second sides T3, T4 have end portions that are welded or connected to end portions of the top and bottom ends T1, T2; and that the length of the top and bottom ends T1, T2 is greater than the length of the first and second sides T3, T4. It should also be noted that the bottom portion BP is perpendicularly connected or welded to the rim R'. Specifically, the first and second ends F1, F2 of the first bar 51a are perpendicularly welded or connected to the first and second sides T3, T4 of the rim R', but may, alternatively, be welded or connected to top end T1. Similarly, the first and second ends F3, F4 of the second bar 41b are perpendicularly welded or connected to the first and second sides R3, R4 of the rim R', but may, alternatively, be connected to the bottom end T2. This configuration creates a structure having an opening OC' that serves as the means of entry into the caddy attachment CA2.

The caddy attachments CA1, CA2 can be manufactured from metal wire bent into the shape of a U-lock. The caddy attachments CA1, CA2 may comprise one or more bands 42 of rubber, silicone or similar material having a high coefficient of friction to tether/restrict the U-lock UL or particular item from movement during transport, as shown in FIG. 13. The caddy attachments CA1, CA2 in conjunction with the one or more bands 42 with high friction fit a wide range of different sized U-shaped locks while minimizing movement and sound. In one embodiment, only the rim R, R' (or a portion thereof) of the caddy attachment includes the bands 42, while in other embodiment, both the rim R, R' and U-shaped bottom portion USP or bottom portion BP include the bands 42. Alternatively, only the U-shaped bottom portion USP or bottom portion BP may include the bands 42. Lastly, it should be noted that the caddy attachment CA2 may comprise one or more elastic bands BZ to fit and secure different sized U-shaped locks UL, as shown in FIG. 15. The elastic bands BZ can be manufactured from any elastic material.

In light of the foregoing description, it should be recognized that embodiments in accordance with the present invention can be realized in numerous configurations contemplated to be within the scope and spirit of the claims. Additionally, the description above is intended by way of example only and is not intended to limit the present invention in any way, except as set forth in any future claim.

What is claimed is:

1. An attachment apparatus for securely attaching objects to a bicycle frame, comprising:
    a transport platform configured to be attached to a bicycle rack;
    wherein the transport platform comprises a base with raised edges having one or more cutout portions;
    wherein the base includes:
    a first end and a second end that are parallel to each other and have the same length,
    a first side and a second side that are parallel to each other and have the same length, and
    wherein the length of the first and second sides of the base is greater than the length of the first and second ends of the base;
    wherein the base further includes one or more holes on the cutout portions that cross through the surface of the base;
    a caddy attachment having a rim and a bottom portion;
    a single piece rail configured to be mechanically inserted or fitted into grooves at the bottom of the base;

wherein the rail includes:
a first end and a second end that are parallel to each other and have the same length,
a first side and a second side that are parallel to each other and have the same length,
wherein the length of the first and second sides of the rail is greater than the length of the first and second ends of the rail;
wherein the rail protrudes or extends beyond the perimeter of the first and second sides of the base, thus creating a cavity between the corresponding first and second sides of the base and the corresponding first and second sides of the rail; and
wherein a first portion of the rim of the caddy attachment is secured to the cutout portions of the base and a second portion of the rim is resting on the rail.

2. The attachment apparatus of claim 1, wherein the transport platform comprises a solar panel fastened to the base.

3. The attachment apparatus of claim 2, wherein the solar panel comprises one or more photovoltaic panels to collect solar energy and a battery to store solar energy.

4. The attachment apparatus of claim 2, wherein the solar panel is configured to fit within the raised edges of the base.

5. The attachment apparatus of claim 2, wherein the solar panel includes one or more holes with threaded inserts configured to receive one or more screws.

6. The attachment apparatus of claim 5, wherein the one or more holes correspond with two holes on the cutout portions of the base.

7. The attachment apparatus of claim 1, wherein the bottom portion of the caddy attachment includes:
a first bar having a first end and a second end;
a second bar having a first end and a second end; and
wherein the first and second bars are parallel to each other.

8. The attachment apparatus of claim 1, wherein the bottom portion of the caddy attachment is U-shaped.

9. The attachment apparatus of claim 7, wherein the bottom portion of the caddy attachment includes one or more support bars connecting opposing portions of the first bar, and one or more support bars connecting opposing portions of the second bar.

10. The attachment apparatus of claim 7, wherein the first and second bars include one or more junctures that cause the bottom portion of the caddy attachment to have a zigzag shape.

11. The attachment apparatus of claim 10, wherein the caddy attachment comprises one or more elastic bands to secure different sized U-shaped locks.

12. The attachment apparatus of claim 1, wherein the rim includes:
a top end and a bottom end, wherein said top and bottom ends are parallel to each other and have the same length;
a first side and second side, wherein said first and second sides are parallel to each other and have the same length; and
wherein the length of the top and bottom ends is greater than the length of the first and second sides.

13. The attachment apparatus of claim 12, wherein:
the first and second ends of the first bar are perpendicular welded or connected to the first side of the rim; and
the first and second ends of the second bar are welded or connected to the second side of the rim.

14. The attachment apparatus of claim 12, wherein:
the first and second ends of the first bar are perpendicular welded or connected to the top end of the rim; and
the first and second ends of the second bar are welded or connected to the bottom end of the rim.

15. The attachment apparatus of claim 12, wherein the rim has one or more indented portions.

16. The attachment apparatus of claim 12, wherein the top end includes one or more folded sections that permit the rim to fit over the rail.

17. The attachment apparatus of claim 1, wherein the rim has one or more indented portions.

18. The attachment apparatus of claim 1, wherein the one or more holes on the cutout portions include threaded inserts configured to receive one or more screws.

19. The attachment apparatus of claim 1, wherein the caddy attachment is secured to the base via one or more screws.

20. The attachment apparatus of claim 1, wherein the caddy attachment comprises one or more bands that provide friction and restrict movement of an item inserted through the rim.

\* \* \* \* \*